June 9, 1942.   C. R. LOOK   2,286,146

PORTABLE LOBSTER AND FISH CONTAINER

Filed Feb. 13, 1941

Inventor:
Clifton R. Look
by James R. Hodder
Attorney

Patented June 9, 1942

2,286,146

UNITED STATES PATENT OFFICE 2,286,146

PORTABLE LOBSTER AND FISH CONTAINER

Clifton R. Look, Addison, Maine

Application February 13, 1941, Serial No. 378,701

1 Claim. (Cl. 119—2)

My present invention is a novel and improved portable container primarily intended for the storage and trasportation of live lobsters, crustaceans, bivalves, fish, and the like.

Heretofore, it has been extremely difficult to transport certain types of live fish, particularly such as lobsters and the like, and to keep them in proper condition for any substantial time or distance. Thus, for example, lobsters cannot remain alive in an ordinary tank of water, as they use up the oxygen quickly. Therefore, it has heretofore been customary to ship lobsters alive only for so far and for as long a period of time as they could be kept alive in proper condition out of water. Efforts have been made to pack them with seaweed, which gives some degree of preservative and sustenance.

I have discovered that by the utilization of means in a tank of water which will maintain the water and air in circulation, and also in combination with means to supply fresh air or oxygen, together with refrigerating means, all in a self-contained and portable unit, that I can maintain and transport live lobsters, crustaceans, etc. for long distances and for a considerable length of time, and keep them in perfect live condition.

In carrying out my invention, I provide a self-contained portable unit of sufficient size to receive a substantial quantity of both water and live lobsters, fish, or the like, to be transported therein, which container includes refrigerating means, and water and air circulating means.

This container, also, is not unduly bulky so that it can be readily handled by truck or train.

Referring to the drawing illustrating an embodiment of the invention:

Figure 1:
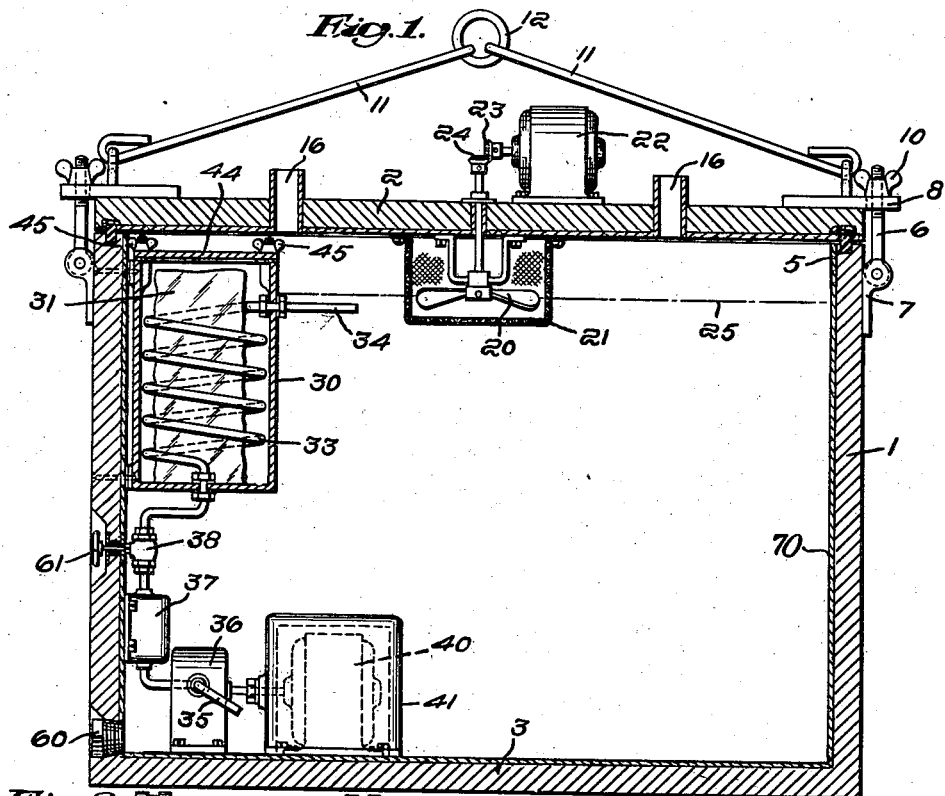
Fig. 1 is a cross-sectional view of a suitable tank embodying my invention.
Figure 2:
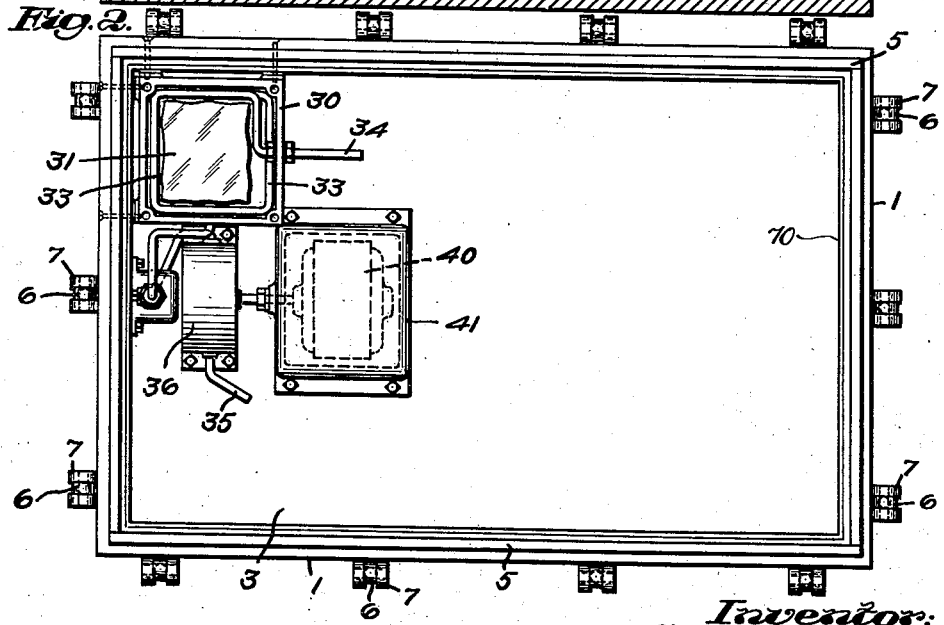
Fig. 2 is a top plan view.

The container or tank may be made of any suitable material, such as wood, metal, or plastics, and may if desired also be lined with a non-corrosive coating, to be a metal which must be of a type and material to be non-injurious to the contents. As illustrated, a tank 1 having a removable cover 2 of suitable area, preferably square, for facility in packing and with a flat bottom 3, which may rest solidly on a support, truck, railroad car, or the like, may be built of wood.

A suitable gasket 5 is fitted in the groove in the upper edge of the side walls of the tank 1 on which upper edge the cover 2 will rest, which cover may also have a groove to hold the gasket therein and render the joint between the cover 2 and tank 1 substantially air-tight. Any suitable means for clamping the cover to the tank may be provided. As herein shown, I utilize a plurality of hinged lugs 6 pivoted to straps 7, secured to the walls of the tank 1 and having an upstanding portion to engage a forked plate 8 on the cover 2, a threaded wing nut 10 being adapted to rotate on the threaded part of the hinged lug 6 and engage the plate 8 and to hold the cover in clamped position.

A hoisting bail 11 from each corner uniting in a ring 12 arranged centrally of the container may be provided for convenience in handling the larger units. The cover 5 has, preferably, one or more air outlets, as shown at 16—16, and in this form of the invention I provide an air and water-circulating means in the form of a fan or propeller 20 mounted in an open wire cage 21 so as to keep the propeller free of entanglement with any of the contents of the tank, which propeller is adapted to be rotated by a motor 22 thru gears 23 and 24, substantially as shown. Any suitable source of power can be attached to the motor 22, and the propeller 20 is preferably at approximately the load-waterline, as indicated at 25, so that air wil be drawn thru and forced into the water in the tank and simultaneously keep the water in circulation, which adds to its preservative feature on the articles contained within the water.

I prefer, also, to supply a simple type of refrigerating means, which, as here shown, would comprise an ice receptacle 30 positioned at one corner within the tank 1 to contain a block of ice 31 and, preferably, with a coil 33 around said ice, leading with an outlet 34 adjacent the top of the tank and a lower inlet 35 thru a pump 36, filter 37, and valve 38, said pump being actuated by a motor 40 within a water-tight cover 41 secured to the bottom 3 of the interior of the tank. Thus, water is drawn in thru the lower inlet 35 and pumped up thru and around the coil 33, where it is cooled by the ice 31 and discharged at 34, thus affording a suitable refrigerating element as well also as aiding in the water circulation within the tank, in addition to the air and propeller 20. Any suitable refrigerating means can, of course, be utilized and a suitable source of power to the motor 40 is readily obtainable either on trucks, trains, or loading stations.

The cover being removed, the tank is filled with water to a suitable level, and the articles, such as a quantity of lobsters, supplied therein, the block of ice is fitted within the receptacle 30 and, preferably, also a cover 44 applied to the ice receptacle by a pair of clamping nuts 45—45 to keep same in position during transportation, the cover 2 applied, the pivoted lugs 6 swung into position, and the thumb nuts 10 rotated to clamp the cover tightly on the container 1. Power is supplied to the motors 22 and 40, and the air and refrigerating instrumentalities kept in service.

These motors need not be continuously operated but preferably are to keep fresh air forced into the water and the water itself in circulation or agitation, thereby keeping the lobsters in a prime and healthy condition.

I prefer to mount the air motor on the cover, and the propeller 20 and its supporting part are lifted out with the removal of the cover. If the material of the tank is of wood or of a substance which might be injurious to the contents, a coating, lining, or the like 70 of non-injurious substance is employed.

My portable container thus constitutes a complete unit with the water-agitating, water-aerating, and refrigerating means in operation—either continually or intermittently—during transportation, and thus maintains the lobsters, fish, or the like in substantially a normal environment, closely simulating the normal and natural conditions in which the lobsters, fish, or the like live. Thus they are maintained in a normal, healthy, fresh condition even at the end of a long journey, both as to distance and time.

In case of salt water fish, it may be desirable to have the water suitably saline; whereas in transporting fresh-water fish, the water can, of course, be fresh.

An important feature is the coating or lining of the interior of the tank, which must be of a non-injurious substance, whether paint, metal, or other material to eliminate any contaminating danger to the contents.

I claim:

A portable container of the kind described, adapted to maintain live lobsters, fish, and the like under normal living conditions for transportation for long distances or storage for a predetermined length of time, comprising a portable water-holding tank, a lining within said tank non-injurious to the living lobsters or fish therein, a removable cover for said tank, watertight closing means between the cover and tank, clamping means to unite said cover and tank in water-tight condition, a quantity of water covering the lobsters, fish, or the like within said tank and suitable to simulate living conditions for the amount of live lobsters, fish or the like contained therein, refrigerating means adjacent the top of said tank to permit refrigerant to be readily supplied thereto, a pipe encircling said refrigerant having one end open into the interior of the tank, and the other end open to the liquid within the bottom portion of the tank, a pump interposed between said ends to maintain water circulation around said refrigerant, a motor carried by the portable container to operate said pump, aerating means comprising a propeller and a power-actuated motor therefor carried by the cover to maintain aeration within the tank, and a plurality of air-openings thru the cover to the top of the tank to facilitate said aerating operation, whereby the liquid is cooled, circulated, and aerated simultaneously.

CLIFTON R. LOOK.